United States Patent
Kiapour et al.

(10) Patent No.: US 11,704,926 B2
(45) Date of Patent: *Jul. 18, 2023

(54) PARALLEL PREDICTION OF MULTIPLE IMAGE ASPECTS

(71) Applicant: eBay Inc., San Jose, CA (US)

(72) Inventors: Mohammadhadi Kiapour, Chapel Hill, NC (US); Ajinkya Gorakhnath Kale, San Jose, CA (US); Robinson Piramuthu, Oakland, CA (US); Licheng Yu, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/523,998

(22) Filed: Nov. 11, 2021

(65) Prior Publication Data

US 2022/0138251 A1 May 5, 2022

Related U.S. Application Data

(63) Continuation of application No. 15/294,762, filed on Oct. 16, 2016, now Pat. No. 11,200,273.

(51) Int. Cl.
*G06V 30/40* (2022.01)
*G06F 16/583* (2019.01)
*G06F 16/16* (2019.01)
*G06V 10/82* (2022.01)
*G06V 10/94* (2022.01)
(Continued)

(52) U.S. Cl.
CPC ............ *G06V 30/43* (2022.01); *G06F 16/164* (2019.01); *G06F 16/583* (2019.01); *G06F 16/5838* (2019.01); *G06N 3/045* (2023.01);
*G06V 10/82* (2022.01); *G06V 10/95* (2022.01); *G06N 7/01* (2023.01); *G06T 2207/20081* (2013.01);
(Continued)

(58) Field of Classification Search
None
See application file for complete search history.

(56) References Cited

U.S. PATENT DOCUMENTS 5,579,471 A 11/1996 Barber et al.
6,829,613 B1 * 12/2004 Liddy ..................... A63H 3/28
707/999.005
(Continued)

FOREIGN PATENT DOCUMENTS

WO 2015192106 A1 12/2015
WO 2018/071501 A1 4/2018
(Continued)

OTHER PUBLICATIONS

Fuhrig,"Future-Proof Your Digital Photos with Better Archiving Techniques", Retrieved from the Internet <URL: https: v//web.archive.org/web/20141203120927 /http:l/lifehacker.com/5725219/future-proof-your-digital-photos-with-better-archiving-techniques>., 2011, 9 pages.
(Continued)

*Primary Examiner* — Jiangeng Sun
(74) *Attorney, Agent, or Firm* — Holland & Hart LLP

(57) ABSTRACT

Example embodiments that analyze images to characterize aspects of the images rely on a same neural network to characterize multiple aspects in parallel. Because additional neural networks are not required for additional aspects, such an approach scales with increased aspects.

20 Claims, 13 Drawing Sheets

(51) Int. Cl.
*G06N 3/045* (2023.01)
*G06N 7/01* (2023.01)
*H04L 67/02* (2022.01)
*H04L 67/01* (2022.01)
*H04L 67/10* (2022.01)

(52) U.S. Cl.
CPC .... *G06T 2207/20084* (2013.01); *H04L 67/01* (2022.05); *H04L 67/02* (2013.01); *H04L 67/10* (2013.01)

(56) References Cited

U.S. PATENT DOCUMENTS

| | | | |
|---|---|---|---|
| 6,901,378 B1 | 5/2005 | Linker et al. | |
| 7,428,516 B2 | 9/2008 | Pittman et al. | |
| 8,260,809 B2 | 9/2012 | Platt et al. | |
| 8,391,618 B1* | 3/2013 | Chuang | G06V 30/274 382/224 |
| 8,737,728 B2 | 5/2014 | Bhardwaj et al. | |
| 8,745,059 B1* | 6/2014 | Jing | G06F 16/5838 707/737 |
| 8,977,629 B2 | 3/2015 | Goswami et al. | |
| 9,025,811 B1* | 5/2015 | Ioffe | G06V 20/35 707/705 |
| 9,141,883 B1* | 9/2015 | Nam | G06K 9/6284 |
| 9,153,231 B1 | 10/2015 | Salvador et al. | |
| 9,424,494 B1 | 8/2016 | Lineback et al. | |
| 9,928,448 B1* | 3/2018 | Merler | G06N 3/08 |
| 10,133,958 B2 | 11/2018 | Kale et al. | |
| 10,430,446 B2 | 10/2019 | Liu et al. | |
| 10,628,481 B2 | 4/2020 | Kiapour et al. | |
| 10,635,727 B2 | 4/2020 | Liu et al. | |
| 11,200,273 B2 | 12/2021 | Kiapour et al. | |
| 2003/0016250 A1* | 1/2003 | Chang | G06F 16/532 715/810 |
| 2003/0063779 A1 | 4/2003 | Wrigley | |
| 2006/0031207 A1* | 2/2006 | Bjarnestam | G06F 40/247 |
| 2006/0031486 A1* | 2/2006 | Miner | G06F 16/48 709/224 |
| 2008/0097859 A1 | 4/2008 | Schrenk | |
| 2008/0199075 A1 | 8/2008 | Gokturk et al. | |
| 2009/0216755 A1 | 8/2009 | Itamar | |
| 2010/0260426 A1* | 10/2010 | Huang | G06V 10/10 707/E17.031 |
| 2012/0321174 A1* | 12/2012 | Tsymbal | G06V 10/7784 382/159 |
| 2013/0166276 A1 | 6/2013 | Raicheigauz et al. | |
| 2013/0330008 A1* | 12/2013 | Zadeh | G06N 20/00 382/195 |
| 2014/0025706 A1* | 1/2014 | Barve | G06F 40/30 707/771 |
| 2014/0133759 A1* | 5/2014 | Yang | G06F 16/583 382/195 |
| 2014/0161360 A1* | 6/2014 | Cao | G06V 20/13 382/218 |
| 2014/0250115 A1 | 9/2014 | Yang | |
| 2014/0307958 A1 | 10/2014 | Wang | |
| 2015/0036919 A1 | 2/2015 | Bourdev et al. | |
| 2015/0036920 A1 | 2/2015 | Wu et al. | |
| 2015/0170005 A1 | 6/2015 | Cohen et al. | |
| 2015/0178786 A1* | 6/2015 | Claessens | G06Q 30/0277 705/14.66 |
| 2015/0269194 A1 | 9/2015 | King et al. | |
| 2015/0379959 A1* | 12/2015 | Dorner | G06Q 30/0631 345/589 |
| 2016/0027180 A1* | 1/2016 | Iyer | G06T 7/143 382/195 |
| 2016/0055237 A1 | 2/2016 | Tuzel et al. | |
| 2016/0117587 A1 | 4/2016 | Yan et al. | |
| 2016/0189009 A1 | 6/2016 | Tran et al. | |
| 2016/0203525 A1 | 7/2016 | Hara et al. | |
| 2016/0217157 A1 | 7/2016 | Shih et al. | |
| 2016/0224652 A1 | 8/2016 | Schwartz et al. | |
| 2016/0300049 A1 | 10/2016 | Guedalia et al. | |
| 2017/0132526 A1* | 5/2017 | Cohen | G06N 20/00 |
| 2017/0177703 A1* | 6/2017 | Liu | G06F 16/285 |
| 2018/0052842 A1 | 2/2018 | Hewavitharana et al. | |
| 2018/0052884 A1 | 2/2018 | Kale et al. | |
| 2018/0052885 A1 | 2/2018 | Gaskill et al. | |
| 2018/0052913 A1 | 2/2018 | Gaskill et al. | |
| 2018/0053273 A1 | 2/2018 | Srivastava | |
| 2018/0107684 A1 | 4/2018 | Kiapour et al. | |
| 2018/0107685 A1 | 4/2018 | Kale et al. | |
| 2018/0108066 A1 | 4/2018 | Kale et al. | |
| 2018/0113938 A1 | 4/2018 | Piramuthu et al. | |
| 2018/0165370 A1 | 6/2018 | Garcia et al. | |

FOREIGN PATENT DOCUMENTS

| | | |
|---|---|---|
| WO | 2018/071525 A1 | 4/2018 |
| WO | 2018071770 A1 | 4/2019 |

OTHER PUBLICATIONS

J.,"Deep Neural Network for Structural Prediction and Lane Detection in Traffic Scene", Retrieved from the internet URL:http://islab.ulsan.ac.kr/files/announcement/552/Deep%20Neural%20Network%20for%20Structural%20Prediction%20and%20lane%20detection%20in%20traffic%20scene.pdf>, in IEEE Transactions on Neural Networks and Learning Systems, vol. 28, No. 3, Mar. 2017, 14 pages.

Lao,"Convolutional Neural Networks for Fashion Classification and Object Detection", Retrieved from the internet URL:<http://cs231n.stanford.edu/reports/2015/pdfs/BLAO_KJAG_CS231N_FinalPaperFashionClassification.pdf>, 2015, 7 pages.

Nock et al., "Bregman Divergences and Surrogates for Learning", IEEE Transactions on Pattern Analysis and Machine Intelligence, vol. 31, No. Nov. 11, 2009, 12 Pages.

International Preliminary Report on Patentability received for PCT Application No. PCT/US2017/056521, dated Apr. 25, 2019, 6 pages.

International Search Report received for PCT Application No. PCT/US2017/056521, dated Jan. 18, 2018, 2 pages.

Written Opinion received for PCT Application No. PCT/US2017/056521, dated Jan. 18, 2018, 4 pages.

Advisory Action Received for U.S. Appl. No. 15/294,762, dated Jul. 21, 2020, 4 pages.

Advisory Action received for U.S. Appl. No. 15/294,762, dated Apr. 20, 2021, 2 Pages.

Corrected Notice of Allowability received for U.S. Appl. No. 15/294,762, dated Sep. 28, 2021, 10 pages.

Final Office Action Received for U.S. Appl. No. 15/294,762, dated Feb. 11, 2021, 12 pages.

Final Office Action received for U.S. Appl. No. 15/294,762, dated Feb. 13, 2020, 12 pages.

Final Office Action received for U.S. Appl. No. 15/294,762, dated May 8, 2019, 13 pages.

First Action Interview—Pre-Interview Communication received for U.S. Appl. No. 15/294,762, dated Jun. 14, 2018, 4 pages.

Non Final Office Action Received for U.S. Appl. No. 15/294,762, dated Aug. 26, 2020, 13 pages.

Non-Final Office Action received for U.S. Appl. No. 15/294,762, dated Dec. 27, 2018, 13 pages.

Non-Final Office Action Received for U.S. Appl. No. 15/294,762, dated Oct. 16, 2019, 11 pages.

Notice of Allowance received for U.S. Appl. No. 15/294,762, dated Aug. 10, 2021, 9 pages.

U.S. Appl. No. 62/375,833 "Determining Personalized Recommendations Corresponding to an Interest" filed Aug. 16, 2016, 33 Pages.

U.S. Appl. No. 62/375,847 "Balancing Implicit and Explicit Indicators to Enhance User Queries" Aug. 16, 2016, 61 pages.

Long et al., "Fully Convolutional Networks for Semantic Segmentation", Retrieved from the internet URL:<https://people.eecs.berkeley.edu/~jonlong/long_shelhamer_fcn.pdf>, CVPR, Jun. 2015, pp. 1-10.

(56) References Cited

OTHER PUBLICATIONS

Zheng et al., "Conditional Random Fields as Recurrent Neural Networks", Retrieved from the internet URL:<http://www.robots.ox.ac.uk/~szheng/papers/CRFasRNN.pdf>, IEEE International Conference on Computer Vision (ICCV),, 2015, pp. 1-17.

\* cited by examiner

PARALLEL PREDICTION OF MULTIPLE IMAGE ASPECTS

RELATED APPLICATIONS

This application is a continuation of U.S. patent application Ser. No. 15/294,762, filed Oct. 16, 2016, which is incorporated herein by reference in its entirety.

TECHNICAL FIELD

Embodiments of the present disclosure relate generally to image search.

BACKGROUND

Present techniques that analyze images to characterize aspects of the images rely on manual techniques that do not scale. Automated techniques use neural networks to characterize aspects of the images. However, because each aspect uses its own neural network, automated techniques also do not scale as the number of aspects increases.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments that analyze images to characterize aspects of the images rely on a same neural network to characterize multiple aspects in parallel. Because additional neural networks are not required for additional aspects, such an approach scales with increased aspects.

Figure 1:
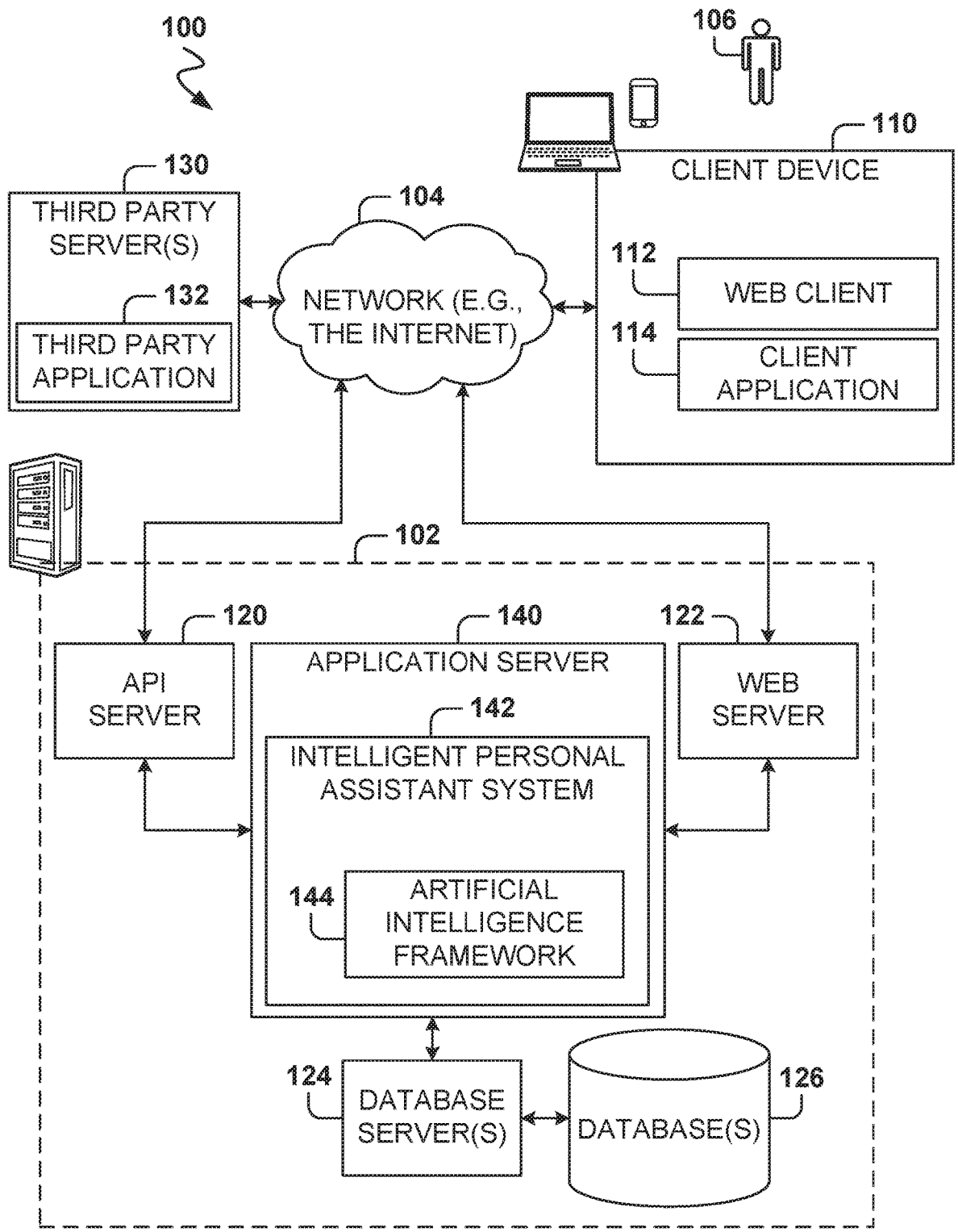
FIG. 1 is a block diagram illustrating a networked system, according to some example embodiments.

FIG. 1 is a block diagram illustrating a networked system, according to some example embodiments. With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 216 and a web server 218 are coupled to, and provide programmatic and web interfaces respectively to, one or more application servers 140. The application server 140 host the intelligent personal assistant system 142, which includes the artificial intelligence framework 144, each of which may comprise one or more modules or applications and each of which may be embodied as hardware, software, firmware, or any combination thereof.

The application server 140 is, in turn, shown to be coupled to one or more database servers 226 that facilitate access to one or more information storage repositories or databases 226. In an example embodiment, the databases 226 are storage devices that store information to be posted (e.g., publications or listings) to the publication system 242. The databases 226 may also store digital item information in accordance with example embodiments.

Additionally, a third-party application 132, executing on third-party servers 130, is shown as having programmatic access to the networked system 102 via the programmatic interface provided by the API server 216. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and personalization system 150 could also be implemented as standalone software programs, which do not necessarily have networking capabilities.

The web client 212 may access the intelligent personal assistant system 142 via the web interface supported by the web server 218. Similarly, the programmatic client 116 accesses the various services and functions provided by the intelligent personal assistant system 142 via the programmatic interface provided by the API server 216.

Additionally, a third-party application(s) 208, executing on a third-party server(s) 130, is shown as having programmatic access to the networked system 102 via the programmatic interface provided by the API server 114. For example, the third-party application 208, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
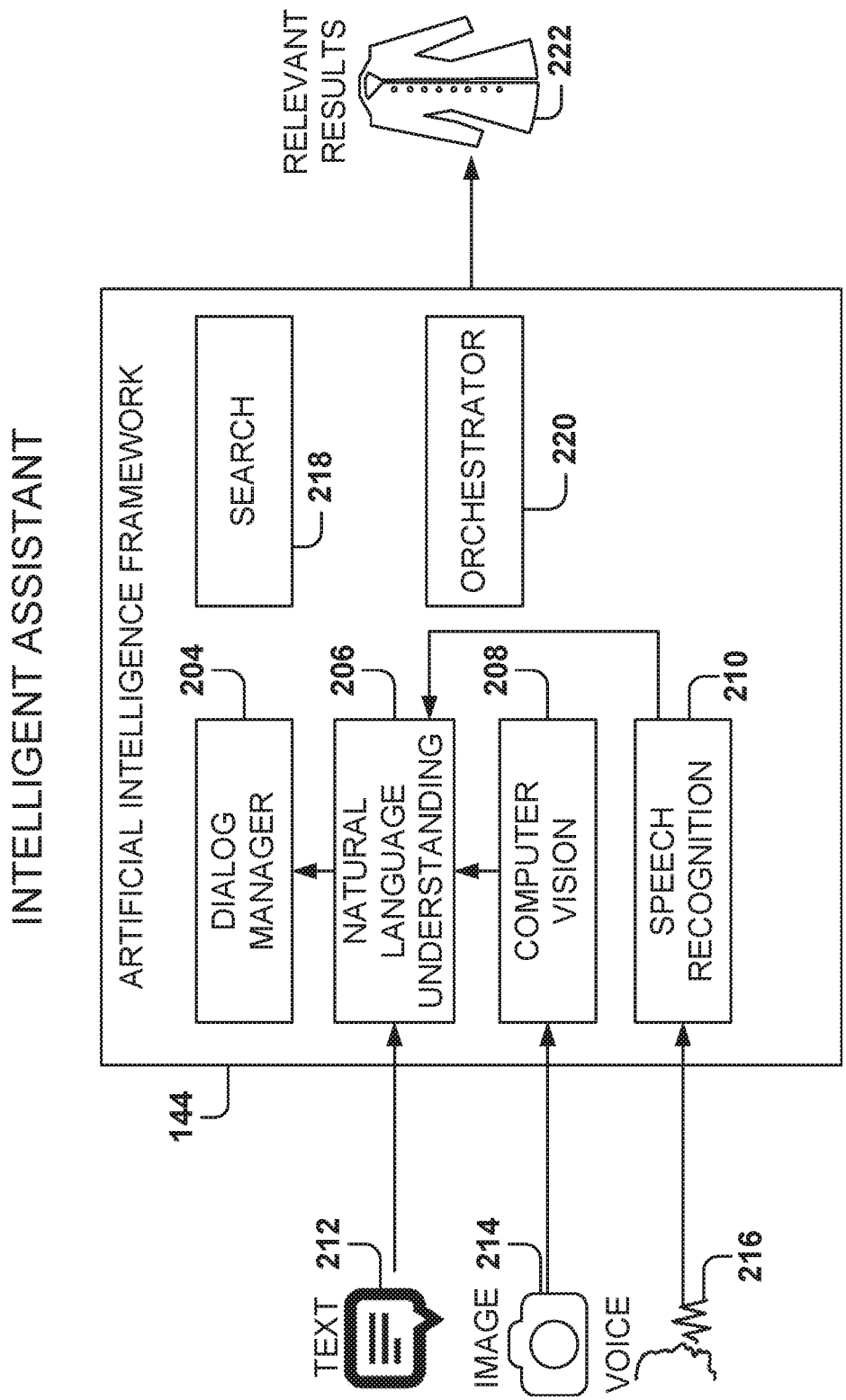
FIG. 2 is a diagram illustrating the operation of the intelligent assistant, according to some example embodiments.

FIG. 2 is a diagram illustrating the operation of the intelligent assistant, according to some example embodiments. Today's online shopping is impersonal, unidirectional, and not conversational. Buyers cannot speak in plain language to convey their wishes, making it difficult to convey intent. Shopping on a commerce site is usually more difficult than speaking with a salesperson or a friend about a product, so oftentimes buyers have trouble finding the products they want.

Embodiments present a personal shopping assistant, also referred to as an intelligent assistant, that supports a two-way communication with the shopper to build context and understand the intent of the shopper, enabling delivery of better, personalized shopping results. The intelligent assistant has a natural, human-like dialog, that helps a buyer with ease, increasing the likelihood that the buyer will reuse the intelligent assistant for future purchases.

The artificial intelligence framework 144 understands the user and the available inventory to respond to natural-language queries and has the ability to deliver incremental improvements in anticipating and understanding the customer and their needs.

The artificial intelligence framework (AIF) 144 includes a dialogue manager 504, natural language understanding (NLU) 206, computer vision 208, speech recognition 210, search 218, and orchestrator 220. The AIF 144 is able to receive different kinds of inputs, such as text input 212, image input 214 and voice input 216, to generate relevant results 222. As used herein, the AIF 144 includes a plurality of services (e.g., NLU 206, computer vision 208) that are implemented by corresponding servers, and the terms service or server may be utilized to identify the service and the corresponding service.

The natural language understanding (NLU) 206 unit processes natural language text input 212, both formal and informal language, detects the intent of the text, and extracts useful information, such as objects of interest and their attributes. The natural language user input can thus be transformed into a structured query using rich information from additional knowledge to enrich the query even further. This information is then passed on to the dialog manager 504 through the orchestrator 220 for further actions with the user or with the other components in the overall system. The structured and enriched query is also consumed by search 218 for improved matching. The text input may be a query for a product, a refinement to a previous query, or other information to an object of relevance (e.g., shoe size).

The computer vision 208 takes image as an input and performs image recognition to identify the characteristics of the image (e.g., item the user wants to ship), which are then transferred to the NLU 206 for processing. The speech recognition 210 takes speech 216 as an input and performs language recognition to convert speech to text, which is then transferred to the NLU for processing.

The NLU 206 determines the object, the aspects associated with the object, how to create the search interface input, and how to generate the response. For example, the AI 144 may ask questions to the user to clarify what the user is looking for. This means that the AIF 144 not only generates results, but also may create a series of interactive operations to get to the optimal, or close to optimal, results 222.

For example, in response to the query, "Can you find me a pair of red nike shoes?" the AIF 144 may generate the following parameters: <intent:shopping, statement-type: question, dominant-object:shoes, target:self, color:red, brand:nike>. To the query, "I am looking for a pair of sunglasses for my wife," the NLU may generate <intent: shopping, statement-type: statement, dominant-object: sunglasses, target:wife, target-gender:female>.

The dialogue manager 504 is the module that analyzes the query of a user to extract meaning, and determines if there is a question that needs to be asked in order to refine the query, before sending the query to search 218. The dialogue manager 504 uses the current communication in context of the previous communication between the user and the artificial intelligence framework 144. The questions are automatically generated dependent on the combination of the accumulated knowledge (e.g., provided by a knowledge graph) and what search can extract out of the inventory. The dialogue manager's job is to create a response for the user. For example, if the user says, "hello," the dialogue manager 504 generates a response, "Hi, my name is bot."

The orchestrator 220 coordinates the interactions between the other services within the artificial intelligence framework 144. More details are provided below about the interactions of the orchestrator 220 with other services with reference to FIG. 5.

Figure 3:
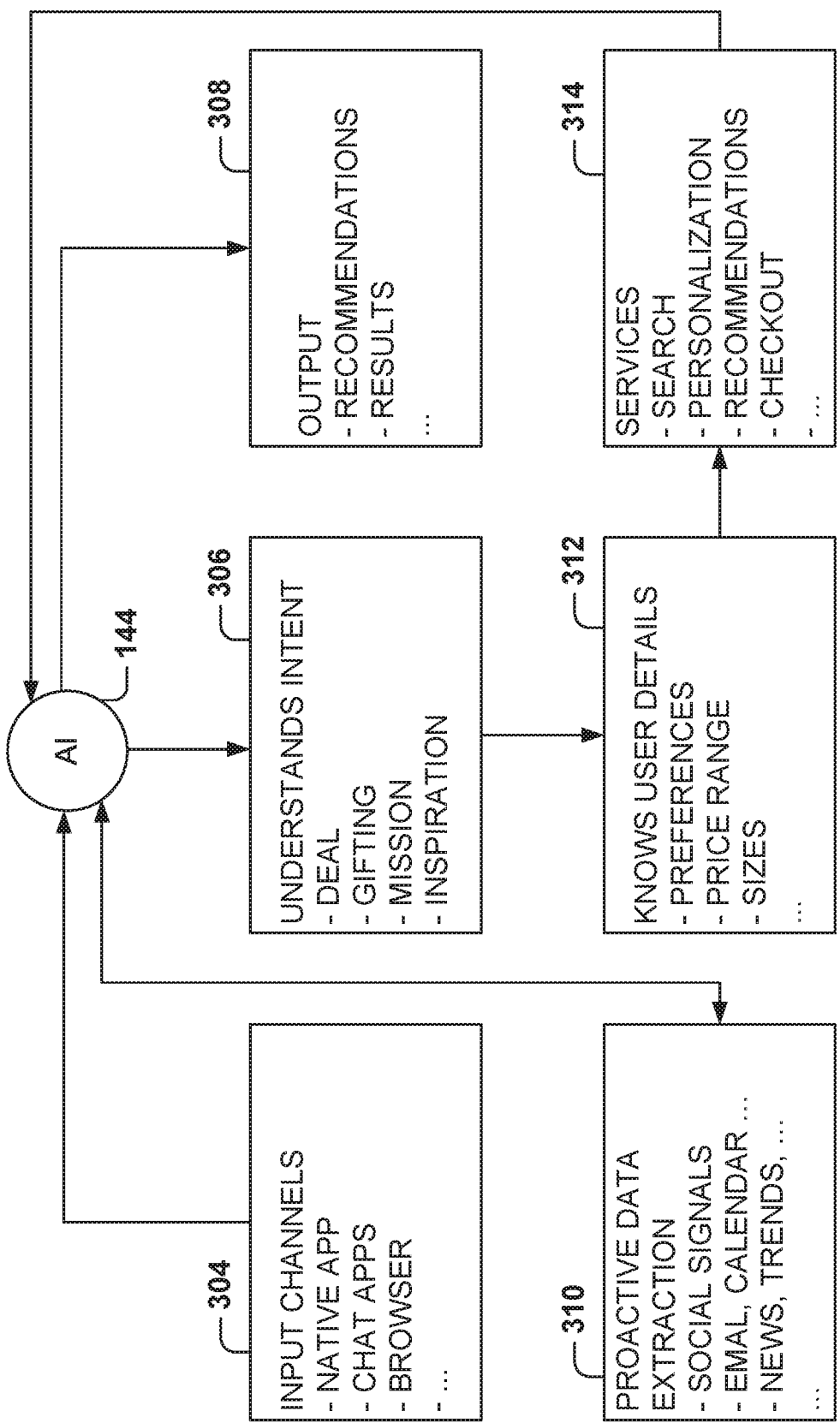
FIG. 3 illustrates the features of the artificial intelligence (AI) framework, according to some example embodiments.

FIG. 3 illustrates the features of the artificial intelligence (AI) framework 144, according to some example embodiments. The AIF 144 is able to interact with several input channels 304, such as native commerce applications, chat applications, social networks, browsers, etc. In addition, the AIF 144 understands the intent 306 expressed by the user. For example, the intent may include a user looking for a good deal, or a user looking for a gift, or a user on a mission to buy a specific product, a user looking for suggestions, etc.

Further, the AIF 144 performs proactive data extraction 310 from multiple sources, such as social networks, email, calendar, news, market trends, etc. The AIF 144 knows about user details 312, such as user preferences, desired price ranges, sizes, affinities, etc. The AIF 144 facilitates a plurality of services within the service network, such as product search, personalization, recommendations, checkout features, etc. The output 308 may include recommendations, results, etc.

The AIF 144 is an intelligent and friendly system that understands the user's intent (e.g., targeted search, compare, shop, browse), mandatory parameters (e.g., product, product category, item), optional parameters (e.g., aspects of the item, color, size, occasion), as well as implicit information (e.g., geo location, personal preferences, age, gender). The AIF 144 responds with a well designed response in plain language.

For example, the AIF 144 may process inputs queries, such as: "Hey! Can you help me find a pair of light pink shoes for my girlfriend please? With heels. Up to $200. Thanks;" "I recently searched for a men's leather jacket with a classic James Dean look. Think almost Harrison Ford's in the new Star Wars movie. However, I'm looking for quality in a price range of $200-300. Might not be possible, but I wanted to see!"; or "I'm looking for a black Northface Thermoball jacket."

Instead of a hardcoded system, the AIF 144 provides a configurable, flexible interface with machine learning capabilities for ongoing improvement. The AIF 144 supports a commerce system that provides value (connecting the user to the things that the user wants), intelligence (knowing and learning from the user and the user behavior to recommend the right items), convenience (offering a plurality of user interfaces), easy of-use, and efficiency (saves the user time and money).

Figure 4:
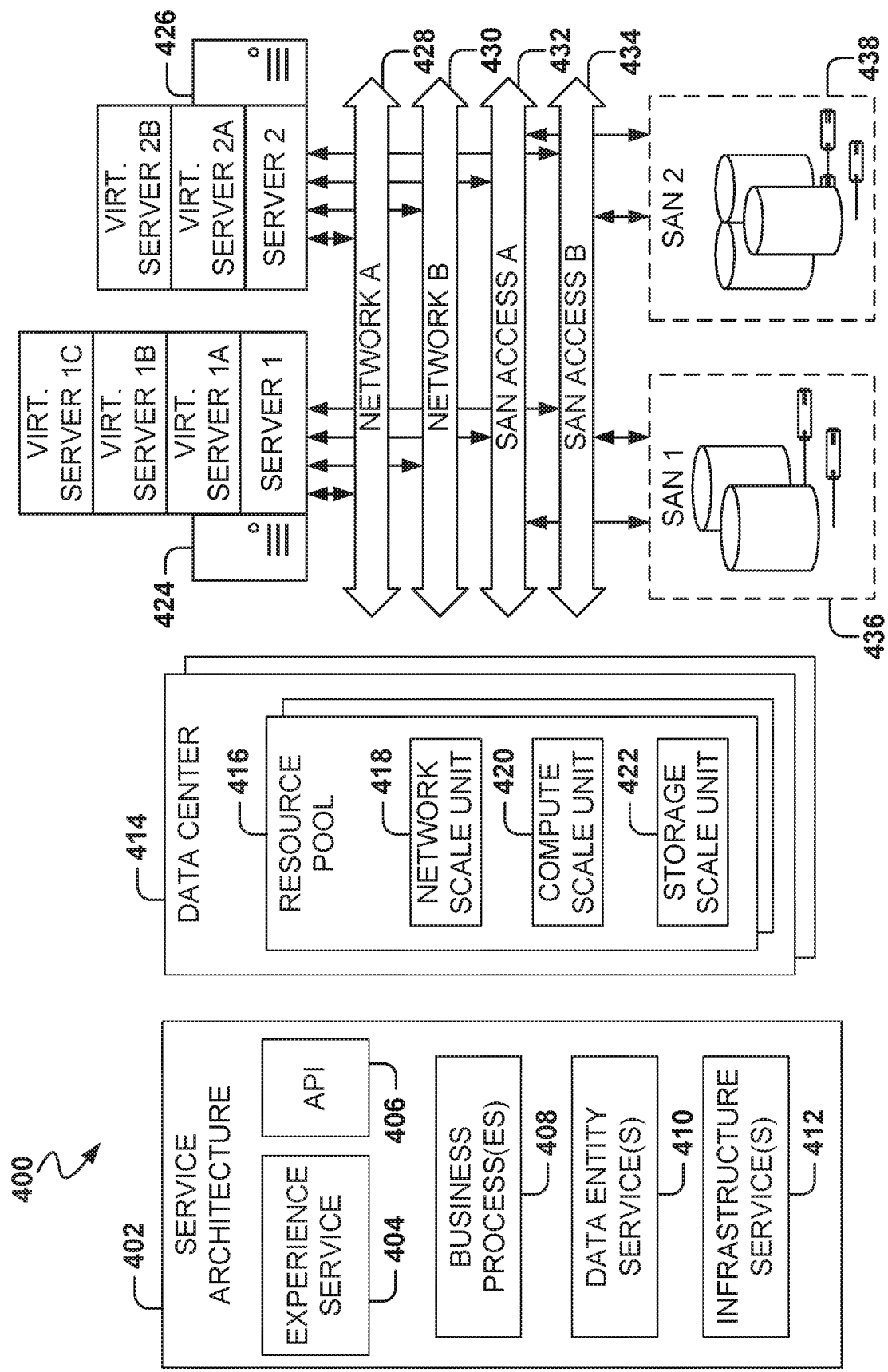
FIG. 4 is a diagram illustrating a service architecture according to some example embodiments.

FIG. 4 is a diagram illustrating a service architecture 400 according to some embodiments. The service architecture 400 presents various views of the service architecture in order to describe how the service architecture may be deployed on various data centers or cloud services. The architecture 400 represents a suitable environment for implementation of the embodiments described herein.

The service architecture 402 represents how a cloud architecture typically appears to a user, developer and so forth. The architecture is generally an abstracted representation of the actual underlying architecture implementation, represented in the other views of FIG. 1. For example, the service architecture 402 comprises a plurality of layers, that represent different functionality and/or services associated with the service architecture 402.

The experience service layer 404 represents a logical grouping of services and features from the end customer's point of view, built across different client platforms, such as applications running on a platform (mobile phone, desktop, etc.), web based presentation (mobile web, desktop web browser, etc.), and so forth. It includes rendering user interfaces and providing information to the client platform so that appropriate user interfaces can be rendered, capturing client input, and so forth. In the context of a marketplace, examples of services that would reside in this layer are home page (e.g., home view), view item listing, search/view search results, shopping cart, buying user interface and related services, selling user interface and related services, after sale experiences (posting a transaction, feedback, etc.), and so forth. In the context of other systems, the experience service layer 404 would incorporate those end user services and experiences that are embodied by the system.

The API layer 406 contains APIs which allow interaction with business process and core layers. This allows third party development against the service architecture 402 and allows third parties to develop additional services on top of the service architecture 402.

The business process service layer 408 is where the business logic resides for the services provided. In the context of a marketplace this is where services such as user registration, user sign in, listing creation and publication, add to shopping cart, place an offer, checkout, send invoice, print labels, ship item, return item, and so forth would be implemented. The business process service layer 408 also orchestrates between various business logic and data entities and thus represents a composition of shared services. The business processes in this layer can also support multi-tenancy in order to increase compatibility with some cloud service architectures.

The data entity service layer 410 enforces isolation around direct data access and contains the services upon which higher level layers depend. Thus, in the marketplace context this layer can comprise underlying services like order management, financial institution management, user account services, and so forth. The services in this layer typically support multi-tenancy.

The infrastructure service layer 412 comprises those services that are not specific to the type of service architecture being implemented. Thus, in the context of a marketplace, the services in this layer are services that are not specific or unique to a marketplace. Thus, functions like cryptographic functions, key management, CAPTCHA, authentication and authorization, configuration management, logging, tracking, documentation and management, and so forth reside in this layer.

Embodiments of the present disclosure will typically be implemented in one or more of these layers. In particular, the AIF 144, as well as the orchestrator 220 and the other services of the AIF 144.

The data center 414 is a representation of the various resource pools 416 along with their constituent scale units. This data center representation illustrates the scaling and elasticity that comes with implementing the service architecture 402 in a cloud computing model. The resource pool 416 is comprised of server (or compute) scale units 420, network scale units 418 and storage scale units 422. A scale unit is a server, network and/or storage unit that is the smallest unit capable of deployment within the data center. The scale units allow for more capacity to be deployed or removed as the need increases or decreases.

The network scale unit 418 contains one or more networks (such as network interface units, etc.) that can be deployed. The networks can include, for example virtual LANs. The compute scale unit 420 typically comprise a unit (server, etc.) that contains a plurality processing units, such as processors. The storage scale unit 422 contains one or more storage devices such as disks, storage attached networks (SAN), network attached storage (NAS) devices, and so forth. These are collectively illustrated as SANs in the description below. Each SAN may comprise one or more volumes, disks, and so forth.

The remaining view of FIG. 1 illustrates another example of a service architecture 400. This view is more hardware focused and illustrates the resources underlying the more logical architecture in the other views of FIG. 1. A cloud computing architecture typically has a plurality of servers or other systems 424, 426. These servers comprise a plurality of real and/or virtual servers. Thus the server 424 comprises server 1 along with virtual servers 1A, 1B, 1C and so forth.

The servers are connected to and/or interconnected by one or more networks such as network A 428 and/or network B 430. The servers are also connected to a plurality of storage devices, such as SAN 1 (436), SAN 2 (438) and so forth. SANs are typically connected to the servers through a network such as SAN access A 432 and/or SAN access B 434.

The compute scale units 420 are typically some aspect of servers 424 and/or 426, like processors and other hardware associated therewith. The network scale units 418 typically include, or at least utilize the illustrated networks A (428) and B (432). The storage scale units typically include some aspect of SAN 1 (436) and/or SAN 2 (438). Thus, the logical service architecture 402 can be mapped to the physical architecture.

Services and other implementation of the embodiments described herein will run on the servers or virtual servers and utilize the various hardware resources to implement the disclosed embodiments.

Figure 5:
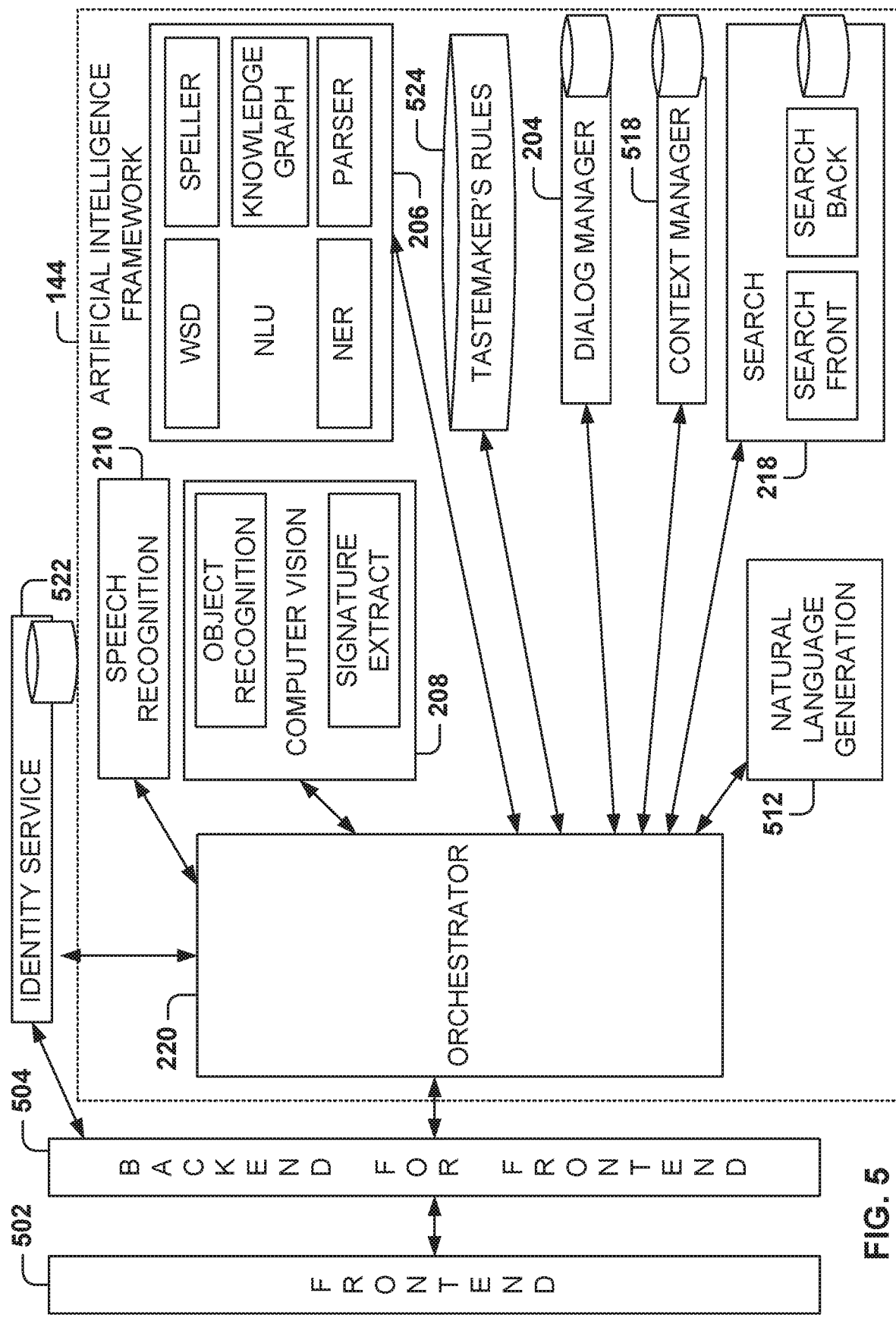
FIG. 5 is a block diagram for implementing the AI framework, according to some example embodiments.

FIG. 5 is a block diagram for implement the AIF 144, according to some example embodiments. Specifically, the intelligent personal assistant system 106 of FIG. 2 is shown to include a front end component 502 (FE) by which the intelligent personal assistant system 106 communicates (e.g., over the network 104) with other systems within the network architecture 100. The front end component 502 can communicate with the fabric of existing messaging systems. As used herein, the term messaging fabric refers to a collection of APIs and services that can power third party platforms such as Facebook messenger, Microsoft Cortana, and others "bots." In one example, a messaging fabric can support an online commerce ecosystem that allows users to interact with commercial intent. Output of the front end component 502 can be rendered in a display of a client device, such as the client device 110 in FIG. 1 as part of an interface with the intelligent personal assistant.

The front end component 502 of the intelligent personal assistant system 106 is coupled to a back end component 504 for the front end (BFF) that operates to link the front end component 502 with the AIF 144. The artificial intelligence framework 144 includes several components discussed below.

In one example embodiment, an orchestrator 220 orchestrates communication of components inside and outside the artificial intelligence framework 144. Input modalities for the AI orchestrator 206 are derived from a computer vision component 208, a speech recognition component 210, and a text normalization component which may form part of the speech recognition component 210. The computer vision component 208 may identify objects and attributes from visual input (e.g., photo). The speech recognition component 210 converts audio signals (e.g., spoken utterances) into text. The text normalization component operates to make input normalization, such as language normalization by rendering emoticons into text, for example. Other normalization is possible such as orthographic normalization, foreign language normalization, conversational text normalization, and so forth.

The artificial intelligence framework 144 further includes a natural language understanding (NLU) component 206 that operates to parse and extract user intent and intent parameters (for example mandatory or optional parameters). The NLU component 206 is shown to include sub-components such as a spelling corrector (speller), a parser, a named entity recognition (NER) sub-component, a knowledge graph, and a word sense detector (WSD).

The artificial intelligence framework 144 further includes a dialog manager 204 that operates to understand a "completeness of specificity" (for example of an input, such as a search query or utterance) and decide on a next action type and a parameter (e.g., "search" or "request further information from user"). In one example, the dialog manager 204 operates in association with a context manager 518 and a natural language generation (NLG) component 512. The context manager 518 manages the context and communication of a user with respect to online personal assistant (or "bot") and the assistant's associated artificial intelligence. The context manager 518 comprises two parts: long term history and short term memory. Data entries into one or both of these parts can include the relevant intent and all parameters and all related results of a given input, bot interaction, or turn of communication, for example. The NLG component 512 operates to compose a natural language utterance out of a AI message to present to a user interacting with the intelligent bot.

A search component 218 is also included within the artificial intelligence framework 144. As shown, the search component 218 has a front-end and a back-end unit. The back-end unit operates to manage item and product inventory and provide functions of searching against the inventory, optimizing towards a specific tuple of intent and intent parameters. An identity service 522 component, that may or may not form part of artificial intelligence framework 144, operates to manage user profiles, for example explicit information in the form of user attributes (e.g., "name," "age," "gender," "geolocation"), but also implicit information in forms such as "information distillates" such as "user interest," or "similar persona," and so forth. The identity service 522 includes a set of policies, APIs, and services that elegantly centralizes all user information, enabling the AIF 144 to have insights into the users' wishes. Further, the identity service 522 protects the commerce system and its users from fraud or malicious use of private information.

The functionalities of the artificial intelligence framework 144 can be set into multiple parts, for example decision-making and context parts. In one example, the decision-making part includes operations by the orchestrator 220, the NLU component 206 and its subcomponents, the dialog manager 204, the NLG component 512, the computer vision component 208 and speech recognition component 210. The context part of the AI functionality relates to the parameters (implicit and explicit) around a user and the communicated intent (for example, towards a given inventory, or otherwise). In order to measure and improve AI quality over time, in some example embodiments, the artificial intelligence framework 144 is trained using sample queries (e.g., a development set) and tested on a different set of queries (e.g., an evaluation set), both sets to be developed by human curation or from use data. Also, the artificial intelligence framework 144 is to be trained on transaction and interaction flows defined by experienced curation specialists, or human override 524. The flows and the logic encoded within the various components of the artificial intelligence framework 144 define what follow-up utterance or presentation (e.g., question, result set) is made by the intelligent assistant based on an identified user intent.

The intelligent personal assistant system 106 seeks to understand a user's intent (e.g., targeted search, compare, shop, browse, and so forth), mandatory parameters (e.g., product, product category, item, and so forth), and optional parameters (e.g., explicit information, e.g., aspects of item/product, occasion, and so forth), as well as implicit information (e.g., geolocation, personal preferences, age and gender, and so forth) and respond to the user with a content-rich and intelligent response. Explicit input modalities can include text, speech, and visual input and can be enriched with implicit knowledge of user (e.g., geolocation, gender, birthplace, previous browse history, and so forth). Output modalities can include text (such as speech, or natural language sentences, or product-relevant information, and images on the screen of a smart device e.g., client device 110. Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. Also, the computer vision component 208 may be used to form shipping parameters based on the image of the item to be shipped. The user may not know what an item is called, or it may be hard or even impossible to use text for fine detailed information that an expert may know, for example a complicated pattern in apparel or a certain style in furniture. Moreover, it is inconvenient to type complex text queries on mobile phones and long text queries typically have poor recall. Key functionalities of the computer vision component 208 include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

With reference to the speech recognition component 210, a feature extraction component operates to convert raw audio waveform to some-dimensional vector of numbers that represents the sound. This component uses deep learning to project the raw signal into a high-dimensional semantic space. An acoustic model component operates to host a statistical model of speech units, such as phonemes and allophones. These can include Gaussian Mixture Models (GMM) although the use of Deep Neural Networks is possible. A language model component uses statistical models of grammar to define how words are put together in a sentence. Such models can include n-gram-based models or Deep Neural Networks built on top of word embeddings. A speech-to-text (STT) decoder component converts a speech utterance into a sequence of words typically leveraging features derived from a raw signal using the feature extraction component, the acoustic model component, and the language model component in a Hidden Markov Model (HMM) framework to derive word sequences from feature sequences. In one example, a speech-to-text service in the cloud has these components deployed in a cloud framework with an API that allows audio samples to be posted for speech utterances and to retrieve the corresponding word sequence. Control parameters are available to customize or influence the speech-to-text process.

Machine-learning algorithms may be used for matching, relevance, and final re-ranking by the AIF 144 services. Machine learning is a field of study that gives computers the ability to learn without being explicitly programmed. Machine learning explores the study and construction of algorithms that can learn from and make predictions on data. Such machine-learning algorithms operate by building a model from example inputs in order to make data-driven predictions or decisions expressed as outputs. Machine-learning algorithms may also be used to teach how to implement a process.

Deep learning models, deep neural network (DNN), recurrent neural network (RNN), convolutional neural network (CNN), and long short-term CNN, as well as other ML models and IR models may be used. For example, search 218 may use n-gram, entity, and semantic vector-based query to product matching. Deep-learned semantic vectors give the ability to match products to non-text inputs directly. Multi-leveled relevance filtration may use BM25, predicted query leaf category+product leaf category, semantic vector similarity between query and product, and other models, to pick the top candidate products for the final re-ranking algorithm.

Predicted click-through-rate and conversion rate, as well as GMV, constitutes the final re-ranking formula to tweak functionality towards specific business goals, more shopping engagement, more products purchased, or more GMV. Both the click prediction and conversion prediction models take in query, user, seller and product as input signals. User profiles are enriched by learning from onboarding, sideboarding, and user behaviors to enhance the precision of the models used by each of the matching, relevance, and ranking stages for individual users. To increase the velocity of model improvement, offline evaluation pipeline is used before online AB testing.

In one example of an artificial intelligence framework 144, two additional parts for the speech recognition component 210 are provided, a speaker adaptation component and an LM adaptation component. The speaker adaptation component allows clients of an STT system (e.g., speech recognition component 210) to customize the feature extraction component and the acoustic model component for each speaker. This can be important because most speech-to-text systems are trained on data from a representative set of speakers from a target region and typically the accuracy of the system depends heavily on how well the target speaker matches the speakers in the training pool. The speaker adaptation component allows the speech recognition component 210 (and consequently the artificial intelligence framework 144) to be robust to speaker variations by continuously learning the idiosyncrasies of a user's intonation, pronunciation, accent, and other speech factors and apply these to the speech-dependent components, e.g., the feature extraction component, and the acoustic model component. While this approach utilizes a non-significant-sized voice profile to be created and persisted for each speaker, the potential benefits of accuracy generally far outweigh the storage drawbacks.

The language model (LM) adaptation component operates to customize the language model component and the speech-to-text vocabulary with new words and representative sentences from a target domain, for example, inventory categories or user personas. This capability allows the artificial intelligence framework 144 to be scalable as new categories and personas are supported.

The AIF's goal is to provide a scalable and expandable framework for AI, one in which new activities, also referred to herein as missions, can be accomplished dynamically using the services that perform specific natural-language processing functions. Adding a new service does not require to redesign the complete system. Instead, the services are prepared (e.g., using machine-learning algorithms) if necessary, and the orchestrator is configured with a new sequence related to the new activity. More details regarding the configuration of sequences are provided below with reference to other figures and associated text.

Embodiments presented herein provide for dynamic configuration of the orchestrator 220 to learn new intents and how to respond to the new intents. In some example embodiments, the orchestrator 220 "learns" new skills by receiving a configuration for a new sequence associated with the new activity. The sequence specification includes a sequence of interactions between the orchestrator 220 and a set of one or more service servers from the AIF 144. In some example embodiments, each interaction of the sequence includes (at least): identification for a service server, a call parameter definition to be passed with a call to the identified service server; and a response parameter definition to be returned by the identified service server.

In some example embodiments, the services within the AIF 144, except for the orchestrator 220, are not aware of each other, e.g., they do not interact directly with each other. The orchestrator 220 manages all the interactions with the other servers. Having the central coordinating resource simplifies the implementation of the other services, which need not be aware of the interfaces (e.g., APIs) provided by the other services. Of course, there can be some cases where a direct interface may be supported between pairs of services.

Figure 6:
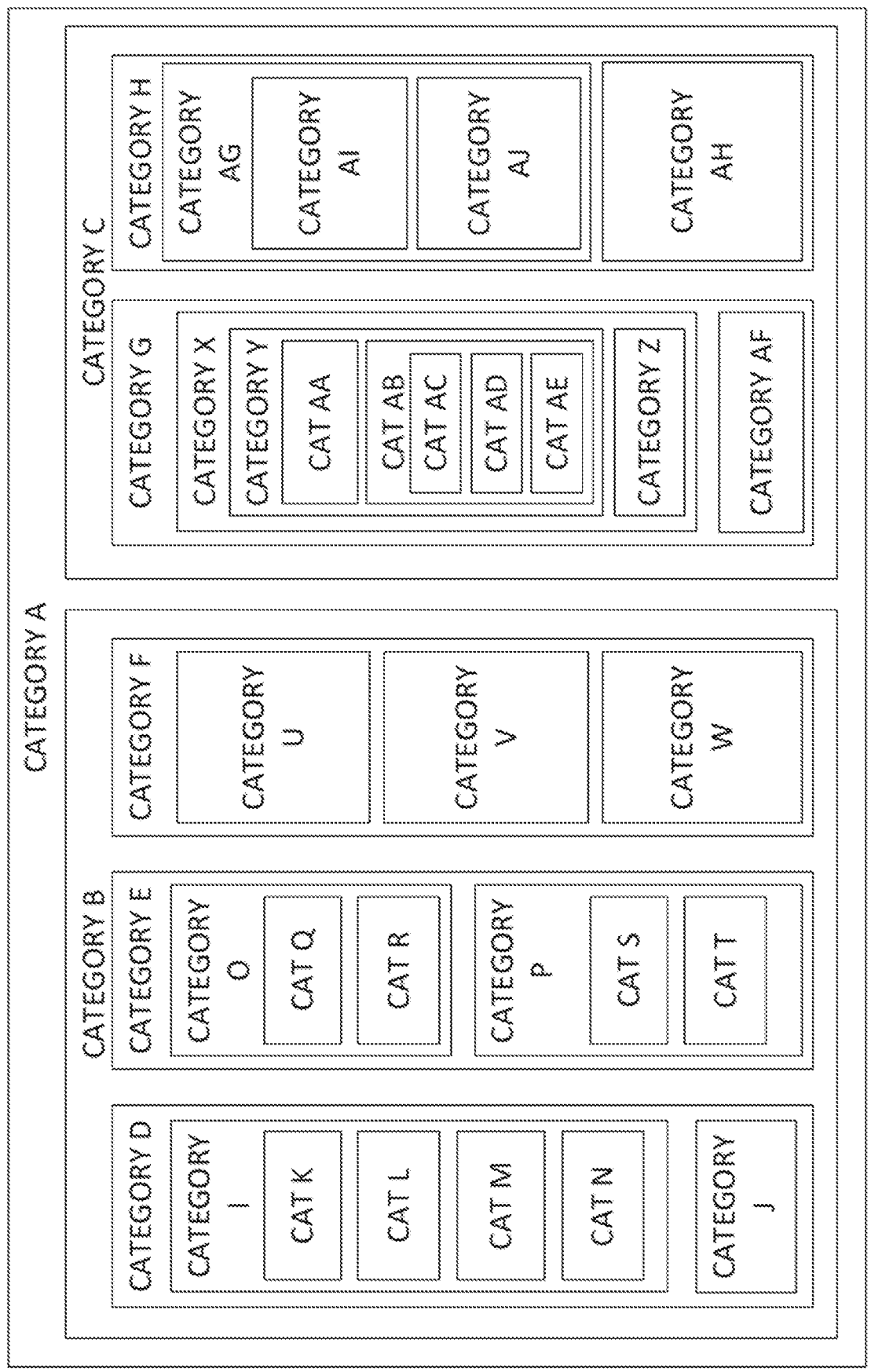
FIG. 6 depicts a diagram of a category hierarchy tree that arranges each publications of a publication corpus into a hierarchy in accordance with some example embodiments.

FIG. 6 depicts a diagram of a category hierarchy tree that arranges each publications of a publication corpus into a hierarchy in accordance with some example embodiments. In some example embodiments, the publication categories are then organized into a hierarchy (e.g., a map or tree), such that more general categories include more specific categories. Each node in the tree or map is a publication category that has a parent category (e.g., a more general category with which the publication category is associated) and potentially one or more child categories (e.g., narrow or more specific categories associated with the publication category). Each publication category is associated with a particular static webpage.

In accordance with some example embodiments, a plurality of publication is grouped together into publication categories. In this example, each category is labeled with a letter (e.g., category A-category AJ). In addition, every publication category is organized as part of a hierarchy of categories.

In this example, category A is a general product category that all other publication categories descend from. Publications in category A are then divided in to at least two different publication categories, category B and category C. It should be noted that each parent category (e.g., in this case category A is a parent category to both Category B and Category C) may include a large number of child categories (e.g., subcategories).

In this example, publication categories B and C both have subcategories (or child categories). For example, if Category A is clothing publications, Category B can be Men's clothes publications and Category C is Women's clothes publications. Subcategories for Category B include category D, category E, and category F. Each of subcategories D, E, and F have a different number of subcategories, depending on the specific details of the publications covered by each subcategory.

For example, if category D is active wear publications, category E is formal wear publications, and category F is outdoor wear publications, each subcategory includes different numbers and types of subcategories. For example, category D (active wear publications in this example) includes subcategories I and J. Subcategory I includes Active Footwear publications (for this example) and Subcategory J includes t-shirt publications. As a result of the differences between these two subcategories, subcategory I includes four additional subcategories (subcategories K-N) to represent different types of active footwear publications (e.g., running shoe publications, basketball shoe publications, climbing shoe publications, and tennis shoe publications). In contrast, subcategory J (which, in this example, is for t-shirt publications) does not include any subcategories (although in a real product database a t-shirt publications category would likely include subcategories).

Thus, each category has a parent category (except for the uppermost product category) which represents a more general category of publications and one or more child categories or subcategories (which are a more specific publications category within the more general category). Thus, category E has two sub-categories, O and P, and each subcategory has two child product categories, categories Q and R and categories S and T, respectively. Similarly, category F has three sub-categories (U, V, and W).

Category C, a product category that has Category A as its parent, includes two additional subcategories (G and H). Category G includes two children (X and AF). Category X includes subcategories Y and Z, and Y includes AA-AE. Category H includes subcategories AG and AH. Category AG includes categories AI and AJ.

Aspects are characteristics of publications listed in a given category. Aspects are specific to a specific category. Aspects of different categories may or may not overlap, or be unique to a specific category.

Figure 7:
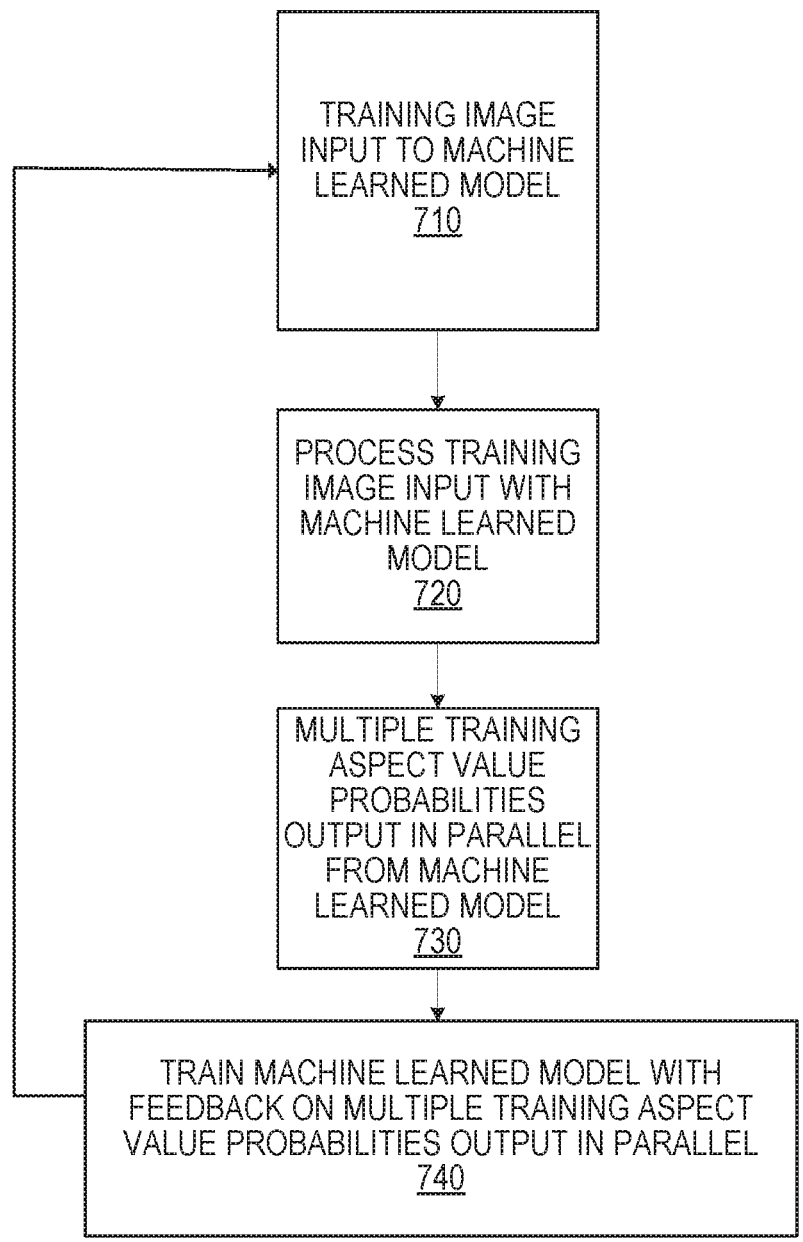
FIG. 7 is an example process flow of training a machine learned model.

FIG. 7 is an example process flow of training a machine learned model. At 710, a training image is input to a machine learned model. At 720, the training image is processed with the machine learned model. At 730, multiple training aspect values are output in parallel from the machine learned model. At 740, the machine learned model is trained by feeding back to the machine learned model whether or not each of the multiple training aspect values was correct.

In an example embodiment, a machine-learned model is used to embed the deep latent semantic meaning of a given listing title and project it to a shared semantic vector space. A vector space can be referred to as a collection of objects called vectors. Vectors spaces can be characterized by their dimension, which specifies the number of independent directions in the space. A semantic vector space can represent phrases and sentences and can capture semantics for image search and image characterization tasks. In further embodiments, a semantic vector space can represent audio sounds, phrases, or music; video clips; and images and can capture semantics for image search and image characterization tasks.

In various embodiments, machine learning is used to maximize the similarity between the source (X), for example, a listing title, and the target (Y), the search query. A machine-learned model may be based on deep neural networks (DNN) or convolutional neural networks (CNN). The DNN is an artificial neural network with multiple hidden layers of units between the input and output layers. The DNN can apply the deep learning architecture to recurrent neural networks. The CNN is composed of one or more convolution layers with fully connected layers (such as those matching a typical artificial neural network) on top. The CNN also uses tied weights and pooling layers. Both the DNN and CNN can be trained with a standard backpropagation algorithm.

When a machine-learned model is applied to mapping a specific <source, target>pair, the parameters for machine-learned Source Model and machine-learned Target Model are optimized so that relevant <source, target>pair has closer vector representation distance. The following formula can be used to compute the minimum distance.

$$SrcMod^*, TgtMod^* = \underset{k \text{ in all training pairs}}{\text{argmin}} \sum \|SrcVec^k - TgtVec^k\|$$

Where,
ScrSeq=a source sequence;
TgtSeq=a target sequence;
SrcMod=source machine-learned model;
TgtMod=target machine-learned model;
SrcVec=a continuous vector representation for a source sequence (also referred to the semantic vector of the source); and
TgtVec=a continuous vector representation for a target sequence (also referred to as semantic vector of the target).

The source machine-learned model encodes the source sequence into a continuous vector representation. The target machine-learned model encodes the target sequence into a continuous vector representation. In an example embodiment, the vectors each have approximately 100 dimensions.

In other embodiments, any number of dimensions may be used. In example embodiments, the dimensions of the semantic vectors are stored in a KD tree structure. The KD tree structure can be referred to a space-partitioning data structure for organizing points in a KD space. The KD tree can be used to perform the nearest-neighbor lookup. Thus, given a source point in space, the nearest-neighbor lookup may be used to identify the closest point to the source point.

Figure 8:
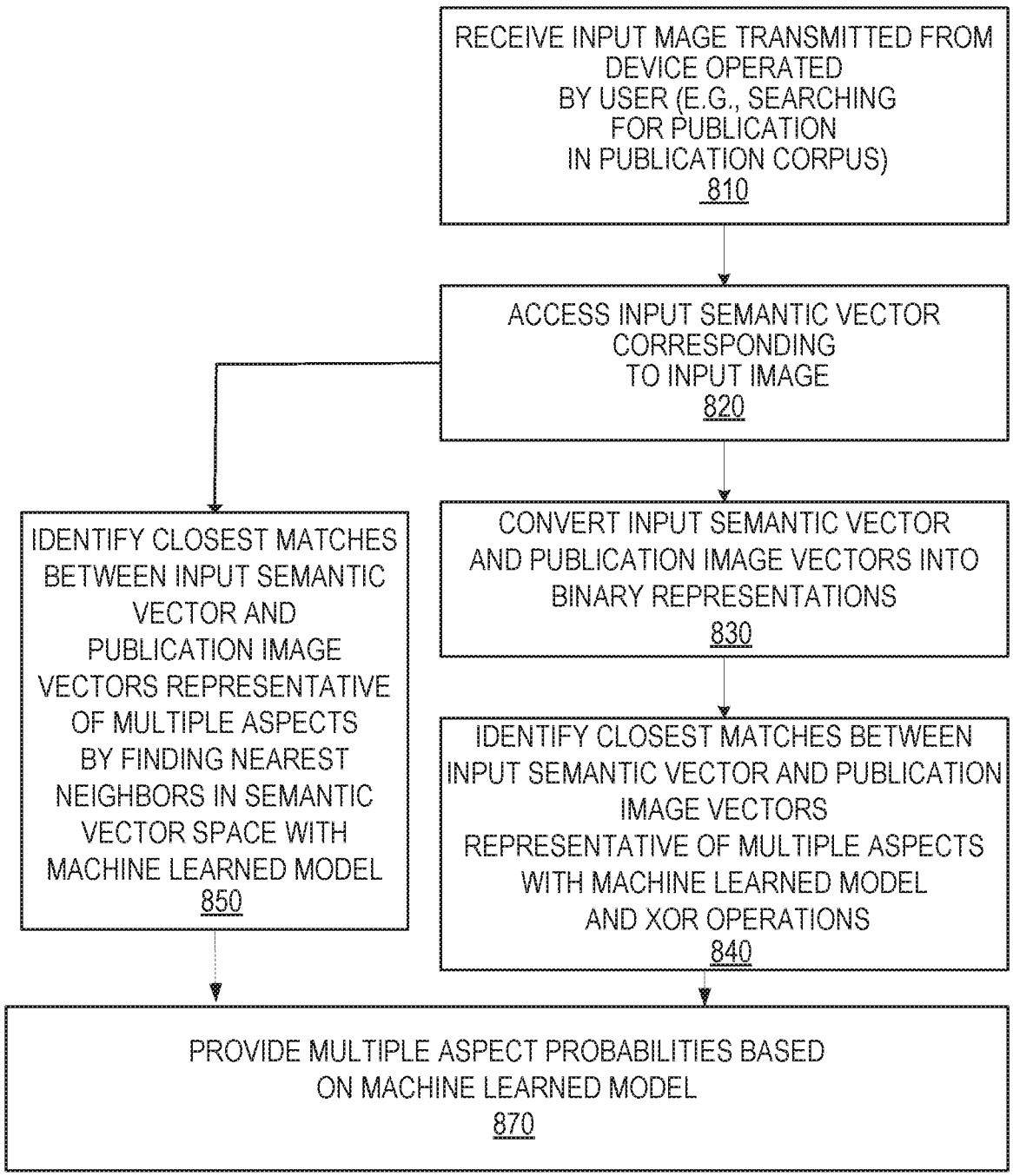
FIGS. 8-11 are example process flows of providing, in parallel, multiple aspect probabilities of an input image.

FIGS. 8-11 are example process flows of providing, in parallel, multiple aspect probabilities of an input image. In FIG. 8, at 810 an input image is transmitted from a device operated by a user. The user may be searching for a publication in a publication corpus. The user may be posting a new publication with publication images, and rely on the process flow to help provide the category. At 820, an input semantic vector corresponding to the input image is accessed. At this point, the process flow splits. At 830, the input semantic vector and publication image vectors are converted into binary representations. At 840, closest matches are identified between the input semantic vector and publication image vectors that are representative of multiple aspects. The machine learned model is used along with XOR operations for speed. A number of common bits from the XOR operation is a measure of similarity. In an alternative flow, at 850 closest matches are identified between the input semantic vector and publication image vectors that are representative of multiple aspects by finding nearest neighbors in semantic vector space. After either of the previous split process flows, at 870 the multiple aspect probabilities are provided, based on the machine learned model.

Figure 9:
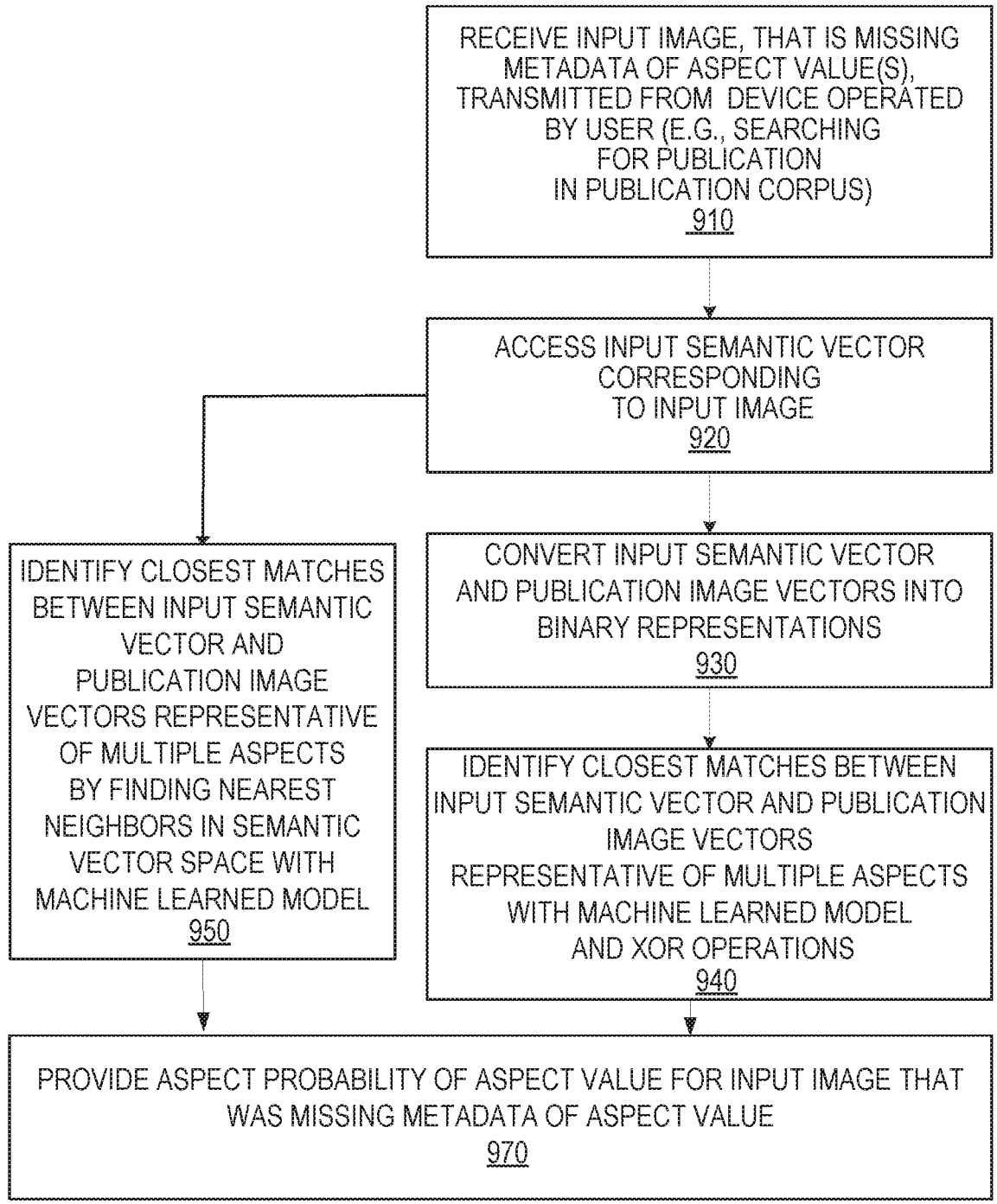

The process flow of FIG. 9 is generally similar to FIG. 8. At 910, the input image is missing category metadata. At 970, at least one aspect probability is provided for the input image that was missing metadata of the aspect value. In another embodiment, at least one aspect probability is provided for the input image that was not missing metadata, to double check the metadata.

Figure 10:
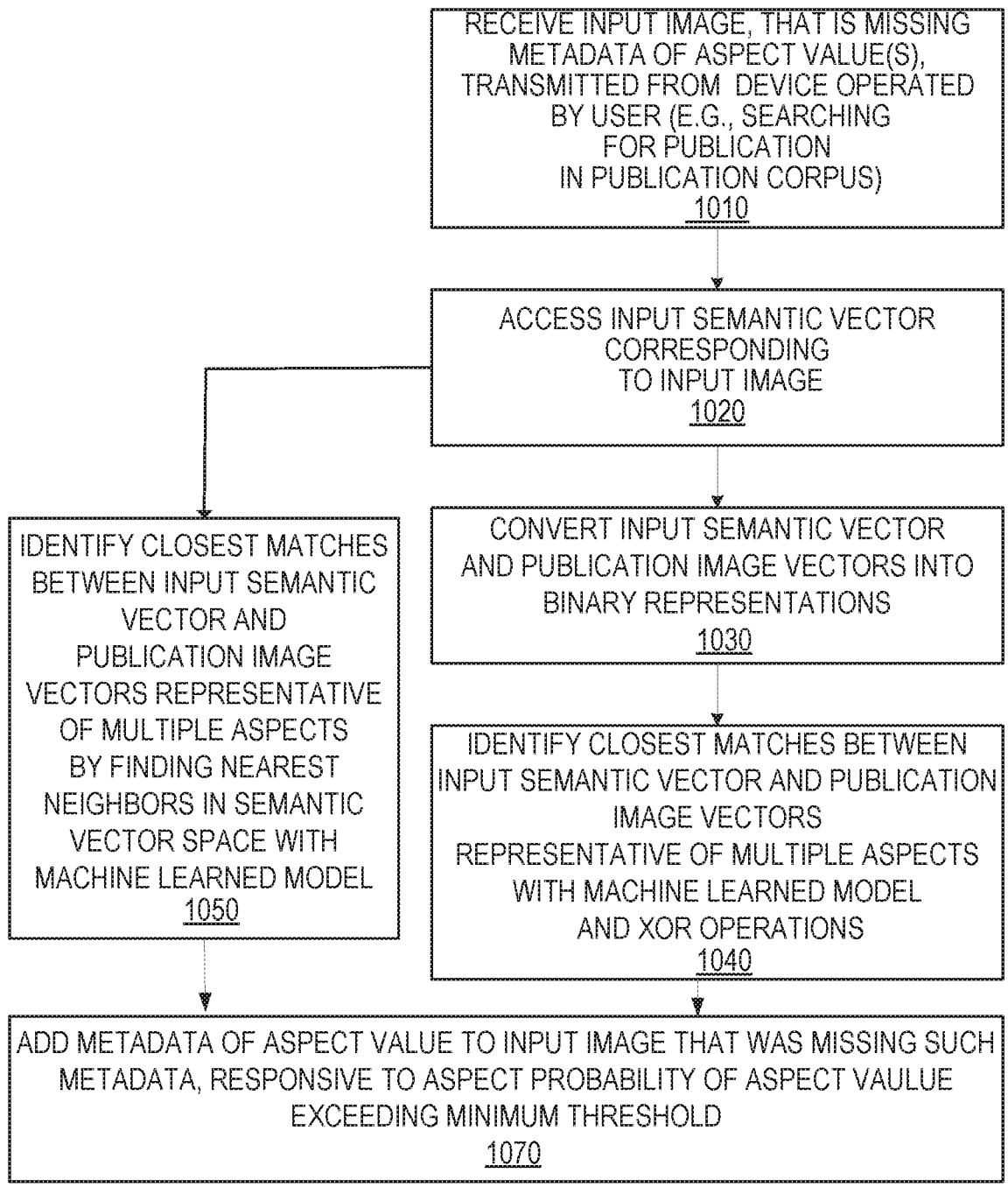

The process flow of FIG. 10 is generally similar to FIG. 9. At 1070, the missing aspect metadata is added to the input image, responsive to an aspect probability exceeding a minimum threshold.

Figure 11:
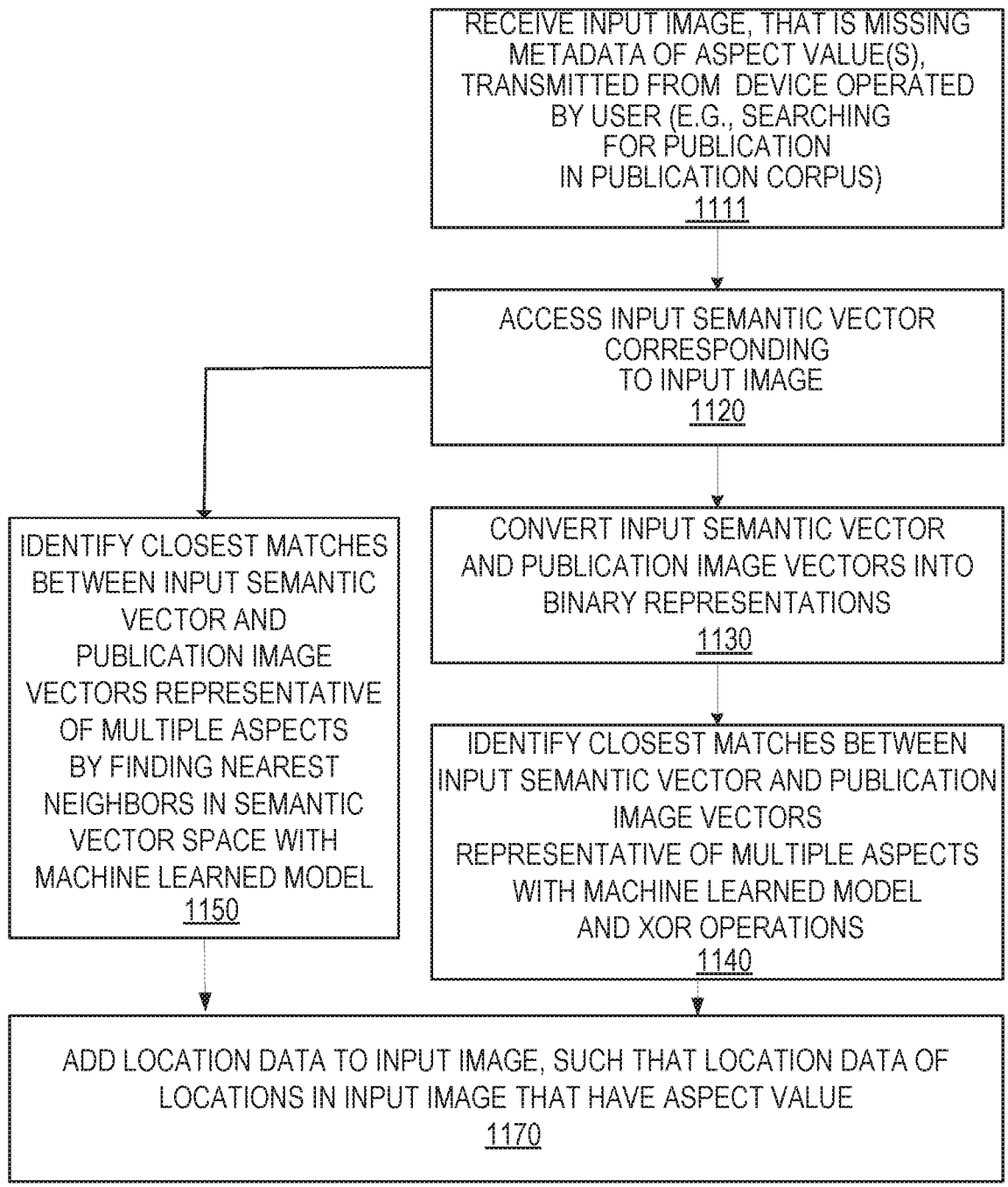

The process flow of FIG. 11 is generally similar to FIG. 10. At 1170, location metadata is added to the input image, such that the location metadata has the location in the input image that has the aspect value.

Figure 12:
FIG. 12 is a diagram illustrating heat maps of location data of locations in the input image that have an aspect value.

FIG. 12 is a diagram illustrating heat maps of location data of locations in the input image that have an aspect value. Images 1210, 1220, and 1230 are input images having the aspect value of hoodie. Respective heat maps 1212, 1222, and 1232 are heat maps having the locations in the images that have the aspect value of hoodie. For example, the hot regions of the heat maps correspond to regions of the input image that have parts of a hoodie, such as a hood, sleeves, and pockets.

Figure 13:
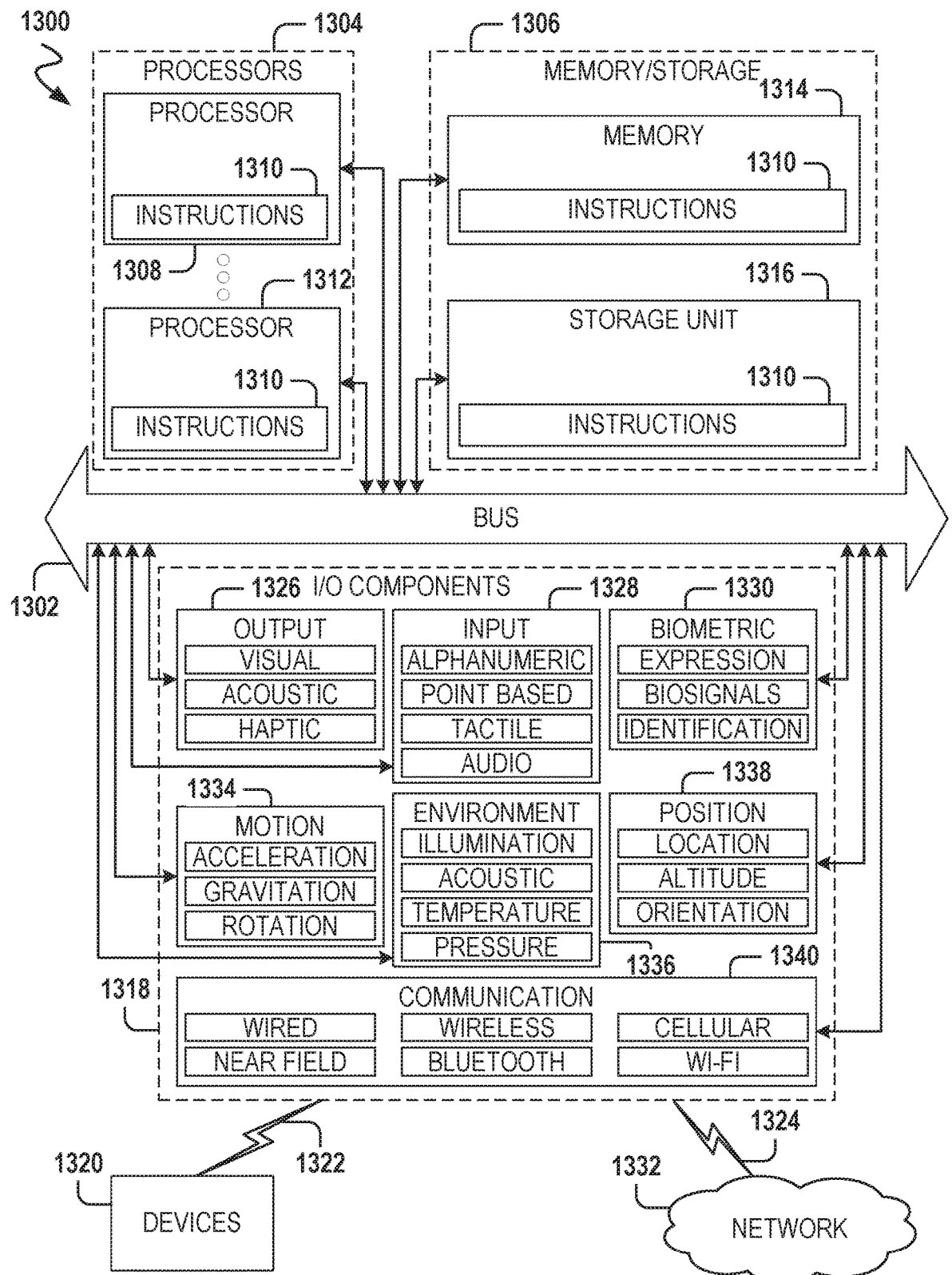
FIG. 13 is a block diagram illustrating components of a machine according to some example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute the flow diagrams of other Figures. Additionally, or alternatively, the instructions 1310 may implement the servers associated with the services and components of other Figures, and so forth. The instructions 1310 transform the general, non-programmed machine 1300 into a particular machine 1300 programmed to carry out the described and illustrated functions in the manner described.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines 1300 that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. In an example embodiment, the processors 1304 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1308 and a processor 1312 that may execute the instructions 1310. The term "processor" is intended to include multi-core processors that may comprise two or more independent processors (sometimes referred to as "cores") that may execute instructions contemporaneously. Although FIG. 13 shows multiple processors 1304, the machine 1300 may include a single processor with a single core, a single processor with multiple cores (e.g., a multi-core processor), multiple processors with a single core, multiple processors with multiples cores, or any combination thereof.

The memory/storage 1306 may include a memory 1314, such as a main memory, or other memory storage, and a storage unit 1313, both accessible to the processors 1304 such as via the bus 1302. The storage unit 1313 and memory 1314 store the instructions 1310 embodying any one or more of the methodologies or functions described herein. The instructions 1310 may also reside, completely or partially, within the memory 1314, within the storage unit 1313, within at least one of the processors 1304 (e.g., within the processor's cache memory), or any suitable combination thereof, during execution thereof by the machine 1300. Accordingly, the memory 1314, the storage unit 1313, and the memory of the processors 1304 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1310. The term "machine-readable medium" shall also be taken to include any medium, or combination of multiple media, that is capable of storing instructions (e.g., instructions 1310) for execution by a machine (e.g., machine 1300), such that the instructions, when executed by one or more processors of the machine (e.g., processors 1304), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1318 may include a wide variety of components to receive input, provide output, produce output, transmit information, exchange information, capture measurements, and so on. The specific I/O components 1318 that are included in a particular machine will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geo-location, location via Wi-Fi® signal triangulation, location via detecting an NFC beacon signal that may indicate a particular location, and so forth.

In various example embodiments, one or more portions of the network 1332 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1332 or a portion of the network 1332 may include a wireless or cellular network and the coupling 1324 may be a Code Division Multiple Access (CDMA) connection, a Global System for Mobile communications (GSM) connection, or another type of cellular or wireless coupling. In this example, the coupling 1324 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1310 may be transmitted or received over the network 1332 using a transmission medium via a network interface device (e.g., a network interface component included in the communication components 1340) and utilizing any one of a number of well-known transfer protocols (e.g., hypertext transfer protocol (HTTP)). Similarly, the instructions 1310 may be transmitted or received using a transmission medium via the coupling 1322 (e.g., a peer-to-peer coupling) to the devices 1320. The term "transmission medium" shall be taken to include any intangible medium that is capable of storing, encoding, or carrying the instructions 1310 for execution by the machine 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by a network-based marketplace, a search query for an item listing of the network-based marketplace, the search query including an input image;
determining that one or more aspect values characterizing the input image are missing, the one or more aspect values comprising a category of an item depicted in the input image, a color of the item depicted in the input image, or both;
in response to the determining that the one or more aspect values characterizing the input image are missing, generating an input semantic vector representing the input image:
generating a set of ranked search results in response to the search query, the set of ranked search results comprising a plurality of images;
providing the input semantic vector as input to a machine learning system of a publication corpus;
identifying, by the machine learning system, matches between the input semantic vector representing the input image and image vectors of the publication corpus, wherein the matches are identified based on a measure of similarity between the input semantic vector and the image vectors;
responsive to said identifying, receiving, from the machine learning system, one or more aspect probabilities indicating the one or more aspect values that characterize the input image, the one or more aspect probabilities identifying a probability that the input image has a respective aspect value of the one or more aspect values characterizing the input image;
responsive to at least one of the one or more aspect probabilities of the input image satisfying a threshold, associating a corresponding aspect value of the one or more aspect values having the at least one of the one or more aspect probabilities with the input image; and
re-ranking search results of the set of ranked search results based on the corresponding aspect value.

2. The method of claim 1, further comprising:
adding a publication to the publication corpus, the publication including an image of the plurality of images.

3. The method of claim 1, wherein receiving, from the machine learning system, the one or more aspect probabilities comprises:
receiving the one or more aspect probabilities as parallel outputs from the machine learning system, wherein the parallel outputs include output location data with a location within a respective image.

4. The method of claim 1, further comprising:
adding metadata comprising the corresponding aspect value of the one or more aspect values having the at least one of the one or more aspect probabilities to the input image.

5. A computer comprising:
a storage device storing instructions; and
one or more hardware processors configured by the instructions to perform operations comprising:
receiving, by a network-based marketplace, a search query for an item listing of the network-based marketplace, the search query including an input image;
determining that one or more aspect values characterizing the input image are missing, the one or more aspect values comprising a category of an item depicted in the input image, a color of the item depicted in the input image, or both;
in response to the determining that the one or more aspect values characterizing the input image are missing, generating an input semantic vector representing the input image:
generating a set of ranked search results in response to the search query, the set of ranked search results comprising a plurality of images;
providing the input semantic vector as input to a machine learning system of a publication corpus;
identifying, by the machine learning system, matches between the input semantic vector representing the input image and image vectors of the publication corpus, wherein the matches are identified based on a measure of similarity between the input semantic vector and the image vectors;
responsive to said identifying, receiving, from the machine learning system, one or more aspect probabilities indicating the one or more aspect values that characterize the input image, the one or more aspect probabilities identifying a probability that the input image has a respective aspect value of the one or more aspect values characterizing the input image;
responsive to at least one of the one or more aspect probabilities of the input image satisfying a threshold, associating a corresponding aspect value of the one or more aspect values having the at least one of the one or more aspect probabilities with the input image; and
re-ranking search results of the set of ranked search results based on the corresponding aspect value.

6. The computer of claim 5, wherein the one or more hardware processors are configured by the instructions to perform operations comprising:
adding a publication to the publication corpus, the publication including an image of the plurality of images.

7. The computer of claim 5, wherein receiving, from the machine learning system, the one or more aspect probabilities comprises:
receiving the one or more aspect probabilities as parallel outputs from the machine learning system, wherein the parallel outputs include output location data with a location within a respective image.

8. The computer of claim 5, wherein the one or more hardware processors are configured by the instructions to perform operations comprising:
adding metadata comprising the corresponding aspect value of the one or more aspect values having the at least one of the one or more aspect probabilities to the input image.

9. A non-transitory computer readable storage medium comprising instructions that when executed configure hardware processing circuitry to perform operations comprising:
receiving, by a network-based marketplace, a search query for an item listing of the network-based marketplace, the search query including an input image;
determining that one or more aspect values characterizing the input image are missing, the one or more aspect values comprising a category of an item depicted in the input image, a color of the item depicted in the input image, or both;
in response to the determining that the one or more aspect values characterizing the input image are missing, generating an input semantic vector representing the input image:

generating a set of ranked search results in response to the search query, the set of ranked search results comprising a plurality of images;

providing the input semantic vector as input to a machine learning system of a publication corpus;

identifying, by the machine learning system, matches between the input semantic vector representing the input image and image vectors of the publication corpus, wherein the matches are identified based on a measure of similarity between the input semantic vector and the image vectors;

responsive to said identifying, receiving, from the machine learning system, one or more aspect probabilities indicating the one or more aspect values that characterize the input image, the one or more aspect probabilities identifying a probability that the input image has a respective aspect value of the one or more aspect values characterizing the input image;

responsive to at least one of the one or more aspect probabilities of the input image satisfying a threshold, associating a corresponding aspect value of the one or more aspect values having the at least one of the one or more aspect probabilities with the input image; and re-ranking search results of the set of ranked search results based on the corresponding aspect value.

10. The non-transitory computer readable storage medium of claim 9, wherein the instructions when executed further configure the hardware processing circuitry to perform operations comprising:
adding a publication to the publication corpus, the publication including an image of the plurality of images.

11. The non-transitory computer readable storage medium of claim 9, wherein receiving, from the machine learning system, the one or more aspect probabilities comprises:
receiving the one or more aspect probabilities as parallel outputs from the machine learning system, wherein the parallel outputs include output location data with a location within a respective image.

12. The non-transitory computer readable storage medium of claim 9, wherein the instructions when executed further configure the hardware processing circuitry to perform operations comprising:
adding metadata comprising the corresponding aspect value of the one or more aspect values having the at least one of the one or more aspect probabilities to the input image.

13. The method of claim 1, further comprising:
determining a product category for the item listing in the network-based marketplace based on the corresponding aspect value.

14. The method of claim 1, wherein determining the one or more aspect values characterizing the input image are missing comprises:
determining that the input image is missing metadata of the one or more aspect values.

15. The method of claim 1, wherein identifying, by the machine learning system, matches between the input semantic vector representing the input image and the image vectors of the publication corpus comprises:
performing an XOR operation to determine a respective number of common bits between the input semantic vector representing the input image and a respective image vector of the publication corpus.

16. The computer of claim 5, wherein the one or more hardware processors are configured by the instructions to perform operations comprising:
determining a product category for the item listing in the network-based marketplace based on the corresponding aspect value.

17. The computer of claim 5, wherein determining the one or more aspect values characterizing the input image are missing comprises:
determining that the input image is missing metadata of the one or more aspect values.

18. The computer of claim 5, wherein identifying, by the machine learning system, matches between the input semantic vector representing the input image and the image vectors of the publication corpus comprises:
performing an XOR operation to determine a respective number of common bits between the input semantic vector representing the input image and a respective image vector of the publication corpus.

19. The non-transitory computer readable storage medium of claim 9, wherein the instructions when executed further configure the hardware processing circuitry to perform operations comprising:
determining a product category for the item listing in the network-based marketplace based on the corresponding aspect value.

20. The non-transitory computer readable storage medium of claim 9, wherein determining the one or more aspect values characterizing the input image are missing comprises:
determining that the input image is missing metadata of the one or more aspect values.

* * * * *